United States Patent Office 2,962,450
Patented Nov. 29, 1960

2,962,450

FOG DISPELLING COMPOSITION

Egon Elöd, Haus Carolina, Badenweiler, Germany, and Karl Schneider, Speiserstrasse 109, Basel, Switzerland No Drawing. Filed Apr. 3, 1957, Ser. No. 650,312

Claims priority, application Germany Apr. 4, 1956

2 Claims. (Cl. 252—319)

The invention relates to a method of precipitating or dispelling atmospheric fogs, and to compositions suitable therefor.

Fogs and clouds are constituted by masses of finest water droplets suspended in water vapor or air. The spherical water droplets in a fog have a large surface tension and therefore great stability, which hinders the coalescence of fine and finest droplets to larger droplets. In addition, the water droplets of the fog consist of the dipoles of the water molecule and are electrically charged. The larger droplets have a positive charge and repel each other. The small droplets are negatively charged, and therefore repel each other too. The high surface tension forces act against a union of the positively charged large droplets and the negatively charged small droplets by neutralization of the charges.

Fog formations disrupt traffic and may cause accidents, particularly on airfields, runways, turnpikes, and the like.

It is a principal object of the invention to dispel fogs quickly and efficiently by speeding up the condensation of the finely dispersed droplets of the fog.

Other objects and advantages will be apparent from a consideration of the specification and claims.

According to the invention, substances decreasing the surface tension of the fog droplets, primarily wetting agents, are sprayed onto or into the fog, so as to cause the coalescence of the fog droplets with formation of larger drops; said action is increased by the presence of condensation nuclei.

As wetting agents we may use, for example, as anionic agents, sulfated alcohols, such as sodium lauryl sulfate, alkylarene-sulfonates, such as dodecylbenzenesulfonate, sodium dibutyl naphthalene sulfonate, or mixtures of alkyl sulfonates with nonionic condensation products of ethylene oxide with organic compounds such as alcohols (oleyl alcohol, stearyl alcohol), acids (abietic acid) and others.

In carrying out the method of the invention, nonionic wetting agents may be used, which are capable of reducing the surface tension of the fog droplets in the desired manner but have no influence on the electrical charge thereof. By the use of cationic wetting agents, we obtain not only a decrease of the surface tension but act also on the charge of the negatively charged droplets and favor the confluence thereof. Similarly, by the use of anionic wetting agents, we can influence the polarity of the positively charged target droplets and in this way favor the condensation thereof. Also, mixtures of cation-active and anion-active wetting agents may be used.

As condensation nuclei, we have used successfully the so-called aerosols, which are dispersions of very fine soild and/or liquid particles. Particularly useful are aerosols which contain finely divided oxides or hydroxides of suitable metalloids or metals, for instance silica alumina, and the like. A good example is the finely divided silica prepared as silica smoke by burning silicon compounds, and marketed by Degussa under the trade name "Aerosil."

Generally, it is of advantage to stablize the aqueous dispersions of aerosols by addition of highly dispersed protective colloids, as, for example, highly degraded bone glue.

The wetting agents and condensation nuclei are applied preferably in mixture, or in solutions or dispersions containing both components. In general, we use mixtures which contain about 50 to about 90 parts of wetting agents and about 50 to about 10 parts of aerosols.

The mixtures may be used in the powdery state, but we prefer to use aqueous solutions or dispersions. If, for instance, aerosols like $SiO_2$ or $Al_2O_3$ are dispersed in water, colloidal solutions of highest dispersity of the particles are obtained which are readily sprayed onto or into the fog in homogeneous distribution without undesired separation of the components. Defogging compositions of this type may be described as aqueous colloidal solutions of wetting agents, which contain oxides or hydroxides of metals or metalloids in highly dispersed form.

The defogging compositions may contain, in addition, hydrogen peroxide or other peroxides. The action mechanism of such peroxides is not yet fully understood. There are some indications that, for instance, hydrogen peroxide spontaneously decomposes on striking the fog and that the decomposition products, perhaps because of their electric discharges, produce nuclei which favor the condensation of the fog droplets. If hydrogen peroxide or other peroxides are incorporated in the defogging compositions, we prefer to use stabilizers which prevent a premature decomposition of the per-compounds.

We prefer to use concentrated hydrogen peroxide solutions of about 30 to 35% $H_2O_2$. About 10 to 50 parts by weight of such a concentrated hydrogen peroxide solution may be employed for 100 parts of wetting agent. The choice of the hydrogen peroxide stabilizer is controlled by the nature of the wetting agent. For anionic wetting agents, we recommend weakly alkaline stabilizers, such as sodium phosphate; for cation-active wetting agents, suitable stabilizers are acid stabilizers, such as phosphoric acid.

Sometimes, it is of advantage to add also antifreezing agents to the defogging compositions. Such agents are, for instance, alcohols, glycols, and the like.

The defogging compositions, which contain a wetting agent, an aerosol acting as condensation nucleus, and, if desired, a peroxide, like hydrogen peroxide, are preferably shipped as concentrates in drums, plastic containers, or the like; for application, they are diluted, for instance with the tenfold water volume. For spraying, machines may be used similar to the equipment developed for spraying crops with insecticides. In order to obtain a very homogeneous and fine distribution of the defogging compositions, preferably sprayers are used which are provided with a spray head consisting of many individual nozzles of small aperture (for instance with bores of .2 mm. diameter). The spray may be produced by air-blast, whereby air is forced under a pressure of several atmospheres through the nozzles and a particularly fine atomization is accomplished by a kind of injector effect. With such sprayers, the defogging liquid can be blown, in form of very small particles, to a distance up to 200 m. The spraying machines may be set up at the place of application, for instance on airfields, railway stations, or near signal installations. On airfields, several sprayers may be provided on the field to free the runways from fog. Preferably, the spraying machines are mobile and rotatable. The sprayers may also be mounted on airplanes, from which the defogging liquid is sprayed backwards. By arranging suitable air flow, the velocity of the plane can be utilized and the liquid can be discharged at great speeds in very fine droplets.

The following examples are given to illustrate the invention.

*Example 1*

A composition containing about 25 percent of di(2-ethylhexyl)ester of sodium sulfosuccinic acid, 50 percent of a 14% aqueous dispersion of a silica aerosol, and 25 percent of a 35% hydrogen peroxide solution stabilized with phosphoric acid, is diluted with the tenfold volume of water and placed in a sprayer arranged beneath the lower surface of the plane. The solution is sprayed by means of compressed air. The defogging composition is sprayed during flying, from the plane rearwardly into or onto the fog layers. After a short time, condensation centers are formed in the fog, which quickly coalesce and sink down in the form of water droplets. In this manner, aerial defogging of airfields can be accomplished quickly and efficiently.

*Example 2*

A defogging composition consisting of 40 percent of the wetting agent marketed by Stockhausen & Co. under the name Sultafon RN, which is a mixture of an alkylbenzene sulfonate and an alkylsulfate and 60 percent of an aqueous dispersion containing 10% alumina aerosol is diluted with water to twelve times the original volume and placed into a mobile spraying machine. The solution is forced by compressed air through fine nozzles and atomized. By means of such mobile sprayers, runways may be freed from fog within a few minutes.

What we claim is:

1. A defogging composition in form of an aqueous dispersion containing at least about 25 percent by weight of a wetting agent and a finely divided oxide of the group consisting of silica and alumina, the ratio of wetting agent to oxide being about 50–90 to about 50–10.

2. A composition as defined in claim 1 containing a peroxide in an amount of about 10 to 50 percent by weight of said wetting agent.

References Cited in the file of this patent

UNITED STATES PATENTS

| | | |
|---|---|---|
| 2,068,987 | King | Jan. 26, 1937 |
| 2,232,728 | Pleasants | Feb. 25, 1941 |
| 2,408,654 | Kirk | Oct. 1, 1946 |
| 2,443,512 | Powers et al. | June 15, 1948 |
| 2,526,684 | Powers et al. | Oct. 24, 1950 |
| 2,597,871 | Iler | May 27, 1952 |
| 2,601,352 | Wolter | June 24, 1952 |
| 2,775,792 | Beardsell et al. | Jan. 1, 1957 |

FOREIGN PATENTS

| | | |
|---|---|---|
| 1,107,120 | France | Aug. 3, 1955 |

OTHER REFERENCES

Schurcliff-Abstract of application Serial No. 531,113, published August 5, 1952, 661 O.G. 305.